US012811770B2

(12) United States Patent
Tunstall et al.

(10) Patent No.: US 12,811,770 B2
(45) Date of Patent: Nov. 24, 2026

(54) MULTIPLICATIVE MASKING FOR CRYPTOGRAPHIC OPERATIONS

(71) Applicant: CRYPTOGRAPHY RESEARCH, INC., San Jose, CA (US)

(72) Inventors: Michael Tunstall, Walnut Creek, CA (US); Francois Durvaux, Louvain-la-neuve (BE)

(73) Assignee: CRYPTOGRAPHY RESEARCH, INC, San Jose, CA (US)

( * ) Notice: Subject to any disclaimer, the term of this patent is extended or adjusted under 35 U.S.C. 154(b) by 233 days.

(21) Appl. No.: 18/131,086

(22) Filed: Apr. 5, 2023

(65) Prior Publication Data

US 2023/0379133 A1 Nov. 23, 2023

Related U.S. Application Data

(63) Continuation of application No. 15/533,974, filed as application No. PCT/US2015/063812 on Dec. 3, 2015, now Pat. No. 11,626,970.

(60) Provisional application No. 62/262,251, filed on Dec. 2, 2015, provisional application No. 62/089,092, filed on Dec. 8, 2014.

(51) Int. Cl.
*H04L 9/00* (2022.01)
*G06F 21/71* (2013.01)

(52) U.S. Cl.
CPC .............. *H04L 9/003* (2013.01); *G06F 21/71* (2013.01); *H04L 2209/046* (2013.01); *H04L 2209/08* (2013.01)

(58) Field of Classification Search
CPC ............... H04L 9/003; H04L 2209/046; H04L 2209/08; G06F 21/71
USPC ........................................................... 713/189
See application file for complete search history.

(56) References Cited

U.S. PATENT DOCUMENTS

| | | | | |
|---|---|---|---|---|
| 4,316,055 | A * | 2/1982 | Feistel | H04L 9/0637 380/37 |
| 5,541,996 | A * | 7/1996 | Ridenour | H04L 9/0662 380/46 |
| 5,717,760 | A * | 2/1998 | Satterfield | H04L 9/0656 380/42 |
| 7,278,034 | B2 * | 10/2007 | Shipton | H04N 1/405 713/300 |
| 8,705,731 | B2 | 4/2014 | Trichina | |
| 8,781,112 | B2 | 7/2014 | Lambert | |

(Continued)

FOREIGN PATENT DOCUMENTS

| | | | |
|---|---|---|---|
| CN | 102468956 | A | 5/2012 |
| CN | 104067217 | A | 9/2014 |
| EP | 2296307 | A1 | 3/2011 |

OTHER PUBLICATIONS

Chaum, David et al., "Wallet Databases With Observers", E.F. Brickell (Ed.): Advances in Crytology—CRYPOT '92, LNCS 740, pp. 89-105, 1993. Springer-Verlag Berlin Heidelberg 1993: 17 Pages.

(Continued)

*Primary Examiner* — Catherine Thiaw
*Assistant Examiner* — Nega Woldermariam
(74) *Attorney, Agent, or Firm* — Lowenstein Sandler LLP

(57) ABSTRACT

A value corresponding to an input for a cryptographic operation may be received. The value may be masked by multiplying the value with a first number modulo a prime number. The cryptographic operation may subsequently be performed on the masked value.

18 Claims, 8 Drawing Sheets

(56) References Cited

U.S. PATENT DOCUMENTS

| | | | | |
|---|---|---|---|---|
| 2005/0147243 | A1* | 7/2005 | Baek | G06F 7/00 380/28 |
| 2005/0232430 | A1* | 10/2005 | Gebotys | H04L 9/003 380/286 |
| 2006/0026224 | A1 | 2/2006 | Merkli | |
| 2006/0029224 | A1* | 2/2006 | Baek | H04L 9/3249 380/30 |
| 2008/0260145 | A1 | 10/2008 | Trichina | |
| 2009/0034724 | A1* | 2/2009 | Liardet | H04L 9/003 380/252 |
| 2010/0306295 | A1* | 12/2010 | Daemen | G06F 7/72 708/250 |
| 2011/0061105 | A1* | 3/2011 | Cuypers | H04L 63/1441 726/26 |
| 2013/0039486 | A1* | 2/2013 | Itoh | H04L 9/3066 380/28 |
| 2013/0182839 | A1* | 7/2013 | Vuillaume | G06F 7/582 708/250 |
| 2013/0236005 | A1* | 9/2013 | Ikeda | H04L 9/003 380/28 |
| 2014/0281573 | A1* | 9/2014 | Jaffe | H04L 9/003 713/189 |
| 2014/0355758 | A1* | 12/2014 | Feix | G06F 7/72 380/46 |
| 2015/0244524 | A1* | 8/2015 | Pulkus | G06F 16/2282 380/28 |
| 2015/0278553 | A1* | 10/2015 | Matsuda | H04L 9/0869 713/192 |
| 2016/0182839 | A1 | 6/2016 | Shigeta et al. | |
| 2018/0351729 | A1* | 12/2018 | Tunstall | H04L 9/003 |
| 2023/0379133 | A1* | 11/2023 | Tunstall | G06F 21/71 |

OTHER PUBLICATIONS

CN Office Action with Mail Date Jul. 30, 2020 re: CN Appln. No. 201580066084.1. 9 pages. With Translation.

CN Office Action with Mail Date Sep. 3, 2019 re: CN Appln. No. 201580066084.1. 13 Pages. (W/Translation).

Daemen, Joan et al., "Specification of Rijndael", The Design of Rijndael; AES—The Advanced Encryption Standard, Jan. 1, 2002, Pringer, pp. 31-51, XP007919936, ISBN: 978-3-540-42580-9 Secion 3.4.1. 23 Pages.

EP Communication Pursuant to Article 94(3) EPC With Mail Date May 27, 2019 re: EP Appln. No. 15868604.8. 6 Pages.

EP Extended European Search Report Dated Jun. 26, 2018 re: EP Appln. No. 15868604.8. 9 Pages.

EP Response filed Jan. 23, 2019 in Response to the Extended European Search Report Dated Jun. 26, 2018 and the Official Communication Pursuant to Rules 70(2) and 70a(2) EPC dated Jul. 13, 2018. 22 Pages.

Fumaroli, Guillaume et al., "Affine Masking against Higher-Order Side Channel Analysis", SAC 2010, Lecture Notes in Computer Science, vol. 6544, pp. 262-280. 25 pages.

Genelle, Laurie et al., "Secure Multiplicative Masking of Power Functions", Applied Cryptography and Network Security, Lecture Notes in Computer Science, vol. 6123, pp. 200-217, 2010. 19 pages.

Genelle, Laurie et al., "Thwarting Higher-Order Side Channel Analysis with Additive and Multiplicative Maskings", Cryptographic Hardware and Embedded Systems, CHES 2011, Lecture Notes in Computer Science, vol. 6917, 2011, pp. 240-255. 16 pages.

Golic, Jovan Dj., "Multiplicative Masking and Power Analysis of AES", In: Kaliski Jr., B.S., Koç, ç.K., Paar, C. (eds.) CHES 2002. LNCS, vol. 2523, pp. 198-212. Springer, Heidelberg (2003). 11 pages.

Notification of Transmittal of the International Search Report and the Written Opinion of the International Searching Authority, or the Declaration with mail date of Feb. 5, 2016 re Int'l. Appln. No. PCT/US15/063812. 14 Pages.

Oswald, Elisabeth et al., "A Side-Channel Analysis Resistant Description of the AES S-box", Gilbert. H., Handschuh, H. (eds.) FSE 2005. LNCS, vol. 3557, pp. 413-423. Springer, Berlin (2005). 11 pages.

Prouff, Emmanuel et al., "Attack on a Higher-Order Masking of the AES Based on Homographic Functions", Indocrypt 2010, Lecture Notes in Computer Science, vol. 6498, pp. 262-281. 20 pages.

Rivain, Matthieu, "Provably Secure Higher-Order Masking of AES", Cryptographic Hardware and Embedded Systems, CHES 2010, Lecture Notes in Computer Science, vol. 6225, pp. 413-427, 2010. 19 pages.

Trichina, Elena et al., "Simplified Adaptive Multiplicative Masking for AES", Cryptographic Hardware and Embedded Systems, CHES 2002, Lecture Notes in Computer Science vol. 2523, pp. 187-197, Feb. 17, 2003. 11 pages.

* cited by examiner

MULTIPLICATIVE MASKING FOR CRYPTOGRAPHIC OPERATIONS

CROSS-REFERENCE TO RELATED APPLICATIONS

This application is a continuation application of co-pending U.S. patent application Ser. No. 15/533,974, filed Jun. 7, 2017, which is a 371 application of International Application No. PCT/US2015/063812, filed Dec. 3, 2015, which claims the benefit of U.S. Provisional Patent Application No. 62/262,251, filed Dec. 2, 2015; and U.S. Provisional Patent Application No. 62/089,092, filed Dec. 8, 2014.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
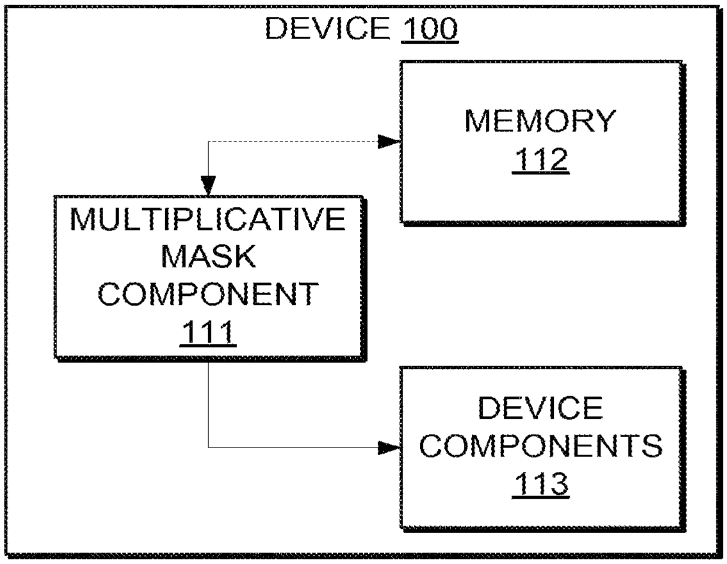
FIG. 1 illustrates an example device using multiplicative masking component for cryptographic operations in accordance with some embodiments.

Aspects of the present disclosure are directed to multiplicative masking for cryptographic operations. An integrated circuit may perform a cryptographic operation that may result in susceptibility of the integrated circuit to a side channel attack where an attacker of the integrated circuit may obtain information as the cryptographic operation is performed. An example of a side channel attack includes, but is not limited to, Differential Power Analysis (DPA) where the attacker who seeks to obtain a secret key used in a cryptographic operation may study the differences in power consumption of the integrated circuit as the cryptographic operation is performed. An attacker may be an unauthorized entity that may obtain the input to the cryptographic operation by analyzing power consumption measurements of the integrated circuit over a period of time.

Accordingly, when the sender transmits a ciphertext to a receiver by encoding plaintext via a cryptographic operation, the attacker may be able to retrieve the secret key that is used to encrypt the plaintext to the ciphertext by observing the power consumption of the integrated circuit as the cryptographic operation is performed to encode a plaintext into a ciphertext. For example, the attacker may uncover a cryptographic (e.g., secret or private) key that is used to encrypt the plaintext as the cryptographic operation is performed by the integrated circuit.

Masking may be used to obfuscate or hide the input to the cryptographic operation with random data and then the cryptographic operation may be performed with the masked input. Such masking may render the intermediate states of the cryptographic operation indistinguishable from random data when an attacker of the integrated circuit observes power consumption of the integrated circuit when performing the cryptographic operation. For example, the plaintext may be subject to an exclusive-or (XOR) operation with a random value before the cryptographic operation encodes the plaintext into the ciphertext. However, the XOR operation between the plaintext and the random value may result in some DPA leakage (e.g., the attacker identifying information from observable differences in power consumption) so that an attacker may still be able to obtain the secret key used in the cryptographic operation.

Multiplicative masking may be applied to the plaintext input of the cryptographic operation. For example, the plaintext input of a cryptographic operation may be multiplied by a random value. However, an integrated circuit performing a cryptographic operation that uses multiplicative masking may still be susceptible to a DPA attack by an attacker observing intermediate states of the cryptographic operation being at a value of zero. Accordingly, if the plaintext input is multiplied by a random value of zero, the resulting zero value may result in a DPA leak.

Accordingly, multiplicative masking for a cryptographic operation that avoids a multiplication with a zero data value may be implemented in an integrated circuit to prevent DPA leaks that allow an attacker to retrieve an input to the cryptographic operation. In some embodiments, such a multiplicative masking may multiply bits of the plaintext input to the cryptographic operation with a value that is based on a multiplication with a random number modulo a prime number. The use of the modular multiplication provides multiplicative masking of the input to a cryptographic operation that may prevent the generation of a zero data value for the masked input and may thus prevent DPA leakage associated with the cryptographic operation as it is being performed by an integrated circuit.

FIG. 1 illustrates an example device including a multiplicative mask component. In general, the device 100 may include an integrated circuit that is associated with a multiplicative mask component 111, a memory 112, and various device components 113. The multiplicative mask component 111 of the integrated circuit may apply a mask to an input (e.g., plaintext) for use in a cryptographic operation performed by the device components 113.

As shown in FIG. 1, the device 100 may include a multiplicative mask component 111. In some embodiments, the multiplicative mask component 111 may apply a mask to the input or portions of the input. For example, the multiplicative mask component 111 may receive an input (e.g., from the memory 112) and may multiply the input or bits of the input with the result of a multiplication with a random number modulo a prime number. The device components 113 may subsequently use the masked input in a cryptographic operation. Examples of such cryptographic operations include, but are not limited to, generating a signature for a message where the message may be used to allow access to particular functionality of the device 100 or to allow the device 100 to perform a particular operation. Accordingly, the multiplicative mask component 111 may modify the input to generate a masked input to the device components 113. Furthermore, a component of the device components 113 may perform a cryptographic operation based on the masked input to generate a signature for a message or other information that may be used to determine whether a sender of the message corresponding to the signature may be allowed to access functionality of the device 100 (e.g., various device components 113) or whether the device 100 may be allowed to perform an operation in response to the message.

Examples of the functionality or operations associated with a device include, but are not limited to, access of certain hardware capabilities of the device (e.g., enable or disable certain hardware capabilities of the device 100), access to debug or diagnostic states of the device, and the writing to a memory associated with the device, adjust performance settings or other values of the device 100, encrypt keys for use by the device 100, modify the memory 112 of the device 100, etc.

The sender of a message may be allowed to access the functionality or operations of the device 100 when the message from the sender is accompanied by a valid signature that is generated by a cryptographic operation. Examples of such cryptographic operations include, but are not limited to, generating a signature associated with Advanced Encryption Standard (AES) and Data Encryption Standard (DES) algorithms where the signature is used in a public-private key cryptosystem. In some embodiments, the cryptographic operation may use the masked input to generate the signature. In some embodiments, the masked input may correspond to a portion of the input (e.g., half of the input) with an added value (e.g., a value of '1') being multiplied with the result of a multiplication with a random number modulo a prime number. In the same or alternative embodiments, the random number may be the dividend and the prime number may be the divisor of the modulus operation.

Figure 2:
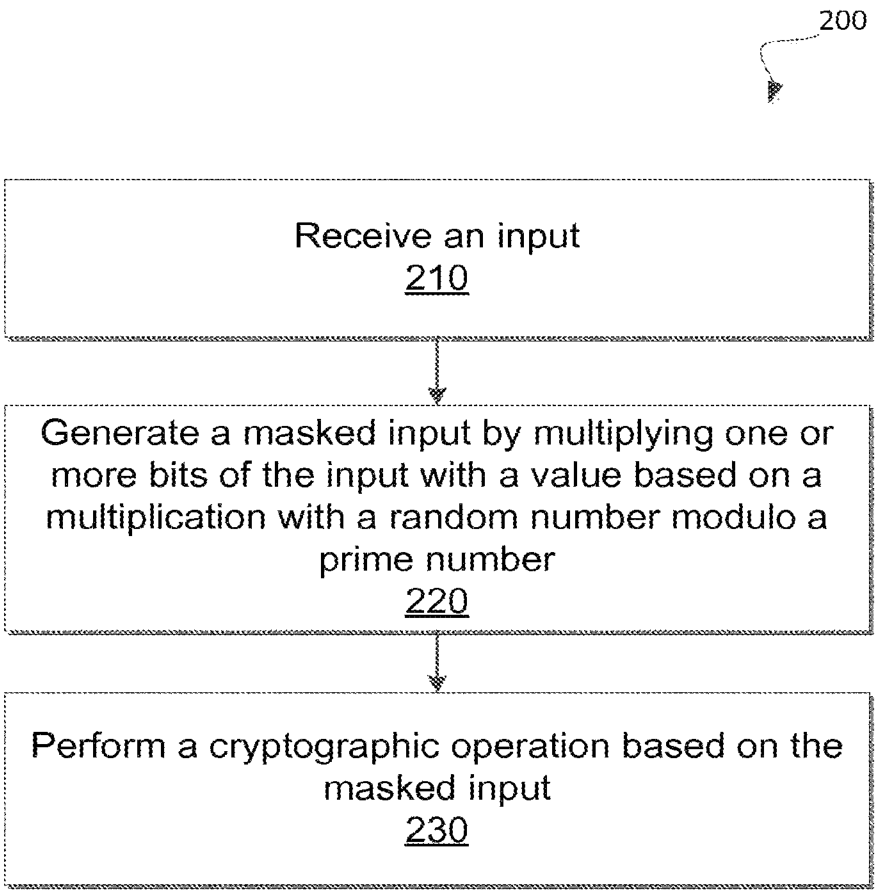
FIG. 2 is a flow diagram of an example method to perform multiplicative masking for cryptographic operations in accordance with some embodiments of the present disclosure.

FIG. 2 is a flow diagram of an example method 200 to perform multiplicative masking for cryptographic operations. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the multiplicative mask component 111 of FIG. 1.

As shown in FIG. 2, the method 200 may begin with the processing logic receiving an input (block 210). For example, plaintext that is to be encoded into ciphertext may be received. The processing logic may further generate a masked input by multiplying portions of the input with a value based on a multiplication with a random number modulo a prime number (block 220). For example, the input may be multiplied by the result of r mod p where r is the random number and p is the prime number. In some embodiments, the input (e.g., the plaintext) may be divided into a first half and a second half and the multiplicative mask may be applied to each half as further described with regard to FIG. 4. For example, a half portion of the input that has been received may be added with a value of '1' and the result may be multiplied by a random number modulo a prime number. In alternative embodiments, the multiplicative mask may be applied to each bit of the input as described in conjunction with FIG. 5. For example, each bit may have its representation changed and be written to an individual computer word, where the bit is then multiplied by a random number modulo a prime number (e.g., one example of such a change in representation is mapping the values of a bit to a positive random number or a negative random number of the same absolute value as the positive random number). Although half portions of the input are described herein, the input may be divided or split into any number of portions. The processing logic may further perform a cryptographic operation based on the masked input (block 230). In some embodiments, the cryptographic operation may be performed by using a modified set of logical operations. For example, the masked input may correspond to plaintext that is to be encoded into ciphertext. In some embodiments, the ciphertext may correspond to a signature and/or a private key.

Figure 3:
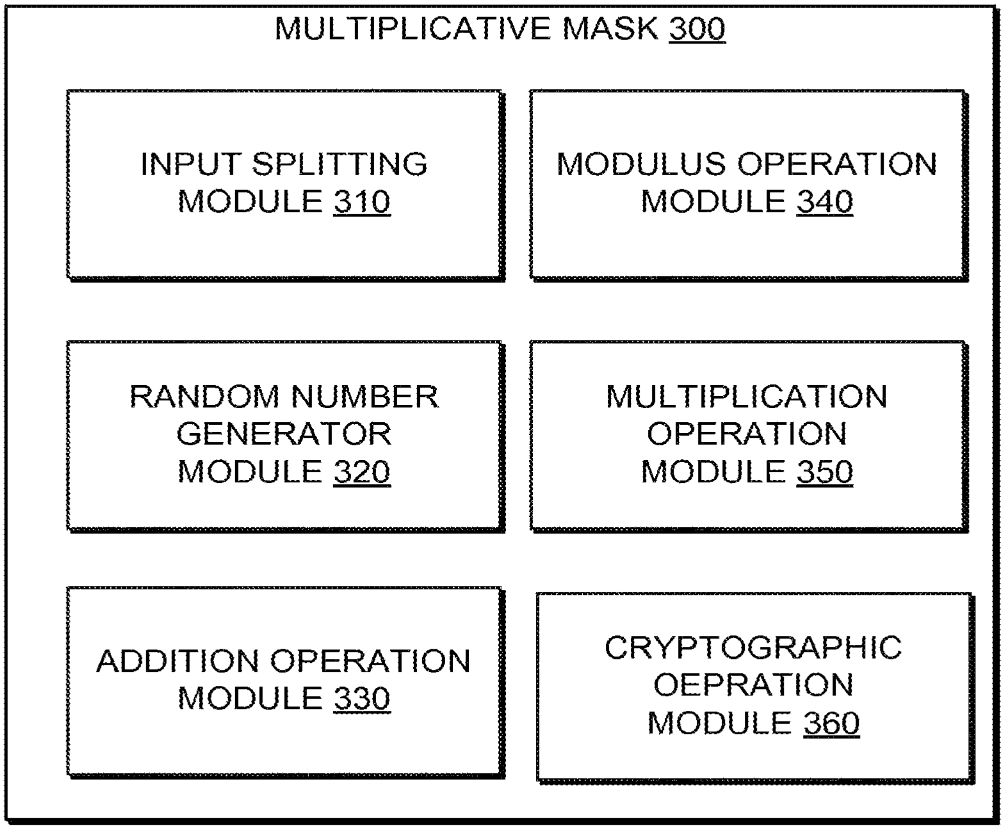
FIG. 3 is a block diagram of a multiplicative mask component to provide multiplicative masking for cryptographic operations in accordance with some embodiments.

FIG. 3 is a block diagram of a multiplicative mask component 300 to provide multiplicative masking for cryptographic operations. In general, the multiplicative mask component 300 may correspond to the multiplicative mask component 111 of FIG. 1. The multiplicative mask component 300 may be implemented by or in processing logic that may comprise hardware (e.g., processing device, circuitry, dedicated logic, programmable logic, microcode, integrated circuit, hardware of a device, etc.), software (e.g., instructions run or executed on a processing device), or a combination thereof. In some embodiments, the multiplicative mask component 300 may include an input splitting module 310, a random number generator module 320, an addition operation module 330, a modulus operation module 340, a multiplication module 350, and a cryptographic operation module 360. In alternative embodiments, the functionality of one or more of the sub-modules may be combined or divided.

As shown in FIG. 3, the multiplicative mask component 300 may include an input splitting module 310. In some embodiments, the input splitting module 310 may receive an input and may divide the input into portions. For example, the input may correspond to plaintext and the input splitting module 310 may split or divide the plaintext input into a first half portion and a second half portion. In some embodiments, the input may correspond to a total of eight bits and the input splitting module 310 may split or divide the eight bit input into a first half portion of four bits and a second half portion of four bits. Alternatively, the input splitting module 310 may process each bit of the input individually as is described in further detail below.

The random number generator module 320 may generate a random number. In some embodiments, the random number that is generated by the random number generator module 320 may be used in a multiplicative mask that is applied to the input or the portion of the input. For example, the generated random number may be used to mask a half portion of the input or may be used to mask each bit of the input. In the same or alternative embodiments, the random number generator module 320 may generate multiple random numbers. For example, a first random number may be generated to be used in a first modulus operation where a prime number is the divisor and a second random number may also be generated to be used in a second modulus operation where a number that is a multiple of the prime number is the divisor of the second modulus operation.

The addition operation module 330 may perform an addition operation to the input or a portion of the input. For example, the addition operation module 330 may add a value of '1' to each half portion of the input. Accordingly, an input may be divided into a first half portion and a second half portion and a value of '1' may be added to each of the first and second half portions. In some embodiments, such addition operations may be applied when the input is split into half portions (e.g., corresponding to an AES cryptographic algorithm) and may not be applied when the input is split into individual bits (e.g., corresponding to a bitwise DES cryptographic algorithm).

The modulus operation module 340 may perform a modulus operation (also referred to as a modular reduction) to be used in a multiplicative mask that is applied to the input or a portion of the input. In some embodiments, a modulus operation may be an arithmetic operation that finds the remainder of the division of one number by another number. For example, the modulus operation may return the remainder after dividing a first number by a second number. A first number a may be the dividend and a second number n may be the divisor in a modulus operation. Such a relationship may be referred to as a modulo n (or abbreviated as a mod n). As an example, the modulus operation corresponding to 17 mod 3 may return the value of 2 as the division of 17 by 3 has a quotient of 5 and leaves a remainder of 2. Furthermore, the modulus operation correspond to 9 mod 3 may return the value of 0 as the division of 9 by 3 has a quotient of 3 and leaves a remainder of 0. Accordingly, when the dividend is a multiple of the divisor, the modulus operation may return a value of 0 (e.g., because there is a remainder of 0), but if the dividend is not a multiple of the divisor, then the modulus operation may return a non-zero value. Furthermore, if the divisor is a prime number (e.g., a number greater than 1 that has no positive divisors other than 1 and itself) and the dividend is not a value of 0 and is between a range of 1 to the prime number, then the modulus operation may never return a value of zero as the prime number itself does not have any other positive divisors other than the value of 1.

The multiplication operation module 350 may perform a multiplication operation between the input or a portion of the input and the result of the modulus operation. For example, the multiplication operation module 350 may multiply a half portion of the input with the added value of '1' with the result of a modulus operation that is based on a random number and a prime number as further described with regard to FIG. 4.

The cryptographic operation module 360 may perform a cryptographic operation on the masked input. For example, the cryptographic operation may encrypt plaintext input into ciphertext based on, but not limited to, AES or DES algorithms.

Figure 4:
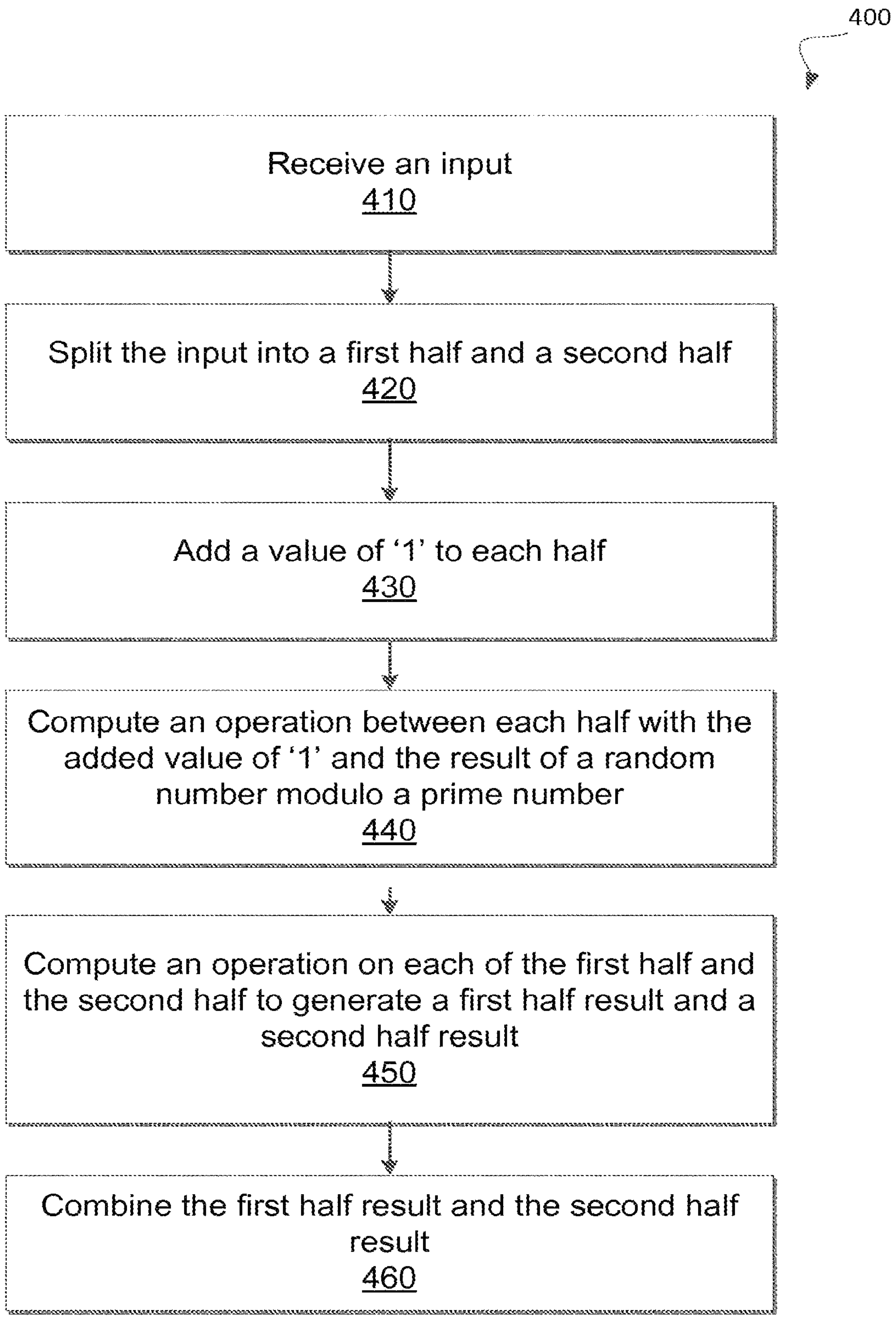
FIG. 4 is a flow diagram of an example method to perform multiplicative masking for an input associated with a cryptographic operation in accordance with some embodiments.

FIG. 4 is a flow diagram of an example method 400 to perform multiplicative masking for an input associated with a cryptographic operation. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the multiplicative mask component 11 of FIG. 1 or the multiplicative mask component 300 of FIG. 3.

The method 400 may be used to provide multiplicative masking for cryptographic operations that are not based on bitwise operations (e.g., cryptographic operations based on AES). The method 400 may begin with the processing logic receiving an input (block 410). For example, a plaintext input corresponding to a signature associated with the operation of a device may be received. The processing logic may further split the input into a first half and a second half (block 420). For example the received input may be an eight bit data corresponding to an AES cryptographic operation. The processing logic may thus divide the eight bit input into two four bit half portions (e.g., a first half portion of four bits and a second half portion of four bits). Furthermore, the processing logic may add a value of '1' to each of the first and second half portions (block 430). The processing logic may additionally compute an operation for each half portion based on the result of a random number modulo a prime number (block 440). For example, the remainder of the modulus operation where the prime number is the divisor and the random number is the dividend may be multiplied with each half portion that has been increased by a value of '1.' The processing logic may further compute an operation on each of the first half and the second half to generate a first half result and a second half result (block 450). Such a second operation may result in a value of zero and may be used to provide additional power consumption without having an effect on the value of the first computed operation. Furthermore, the processing logic may combine the first half result and the second half result (block 460).

In some embodiments, the method 400 may require the computation of operations such as a bitwise XOR operation. Such an operation may take the form of precomputed tables that allow a computer word to be mapped to a series of words with a small bit length (e.g., mapping a byte to two four-bit words). A precomputed table may also be generated to map two four bit words to one four bit word representing the XOR of the two input values. A further precomputed table may then be used to map the resulting four-bit words to a computer word (e.g., two four-bit words to a byte). In some embodiments, all of the input and output values of these tables may be masked with the multiplicative masking technique as described herein.

Figure 5:
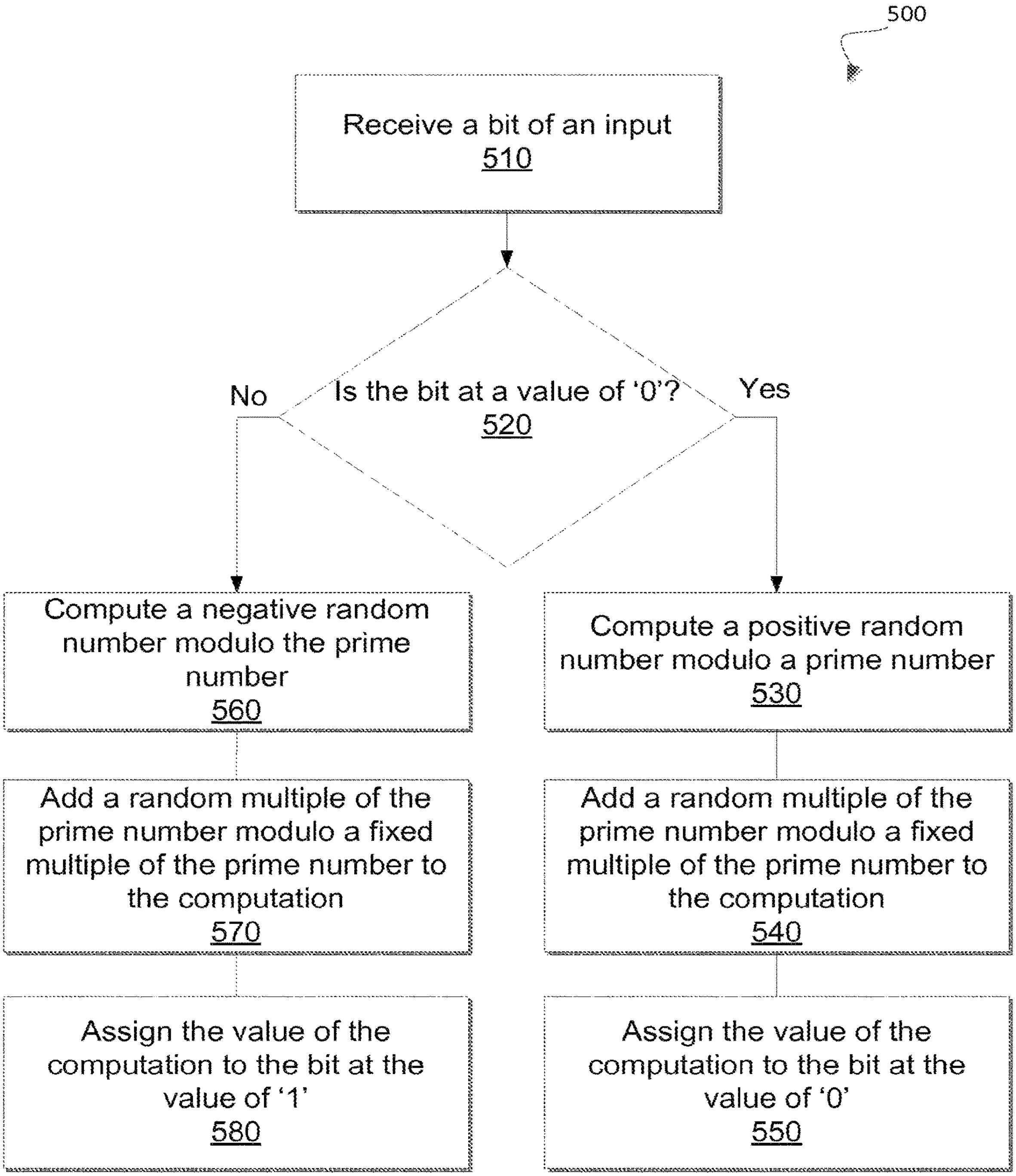
FIG. 5 is a flow diagram of an example method to perform multiplicative masking for an input to allow bitwise operations associated with a cryptographic operation in accordance with some embodiments.

FIG. 5 is a flow diagram of an example method 500 to perform multiplicative masking for an input to allow bitwise operations associated with a cryptographic operation. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the multiplicative mask component 111 of FIG. 1 or the multiplicative mask 300 of FIG. 3.

The method 500 may be used when a cryptographic algorithm (e.g., DES) is based on bitwise operations. The method 500 may be used to transform or mask bit values from a value of '0' or '1' to a value corresponding to a positive and negative number (e.g., 1 and −1). The transformation of the values from '0' to '1' and '1' to '−1' may allow the use of bitwise operations (e.g., XOR) to use the masked input data in a cryptographic operation. In some embodiments, the method 500 may perform multiplicative masking based on the following equations:

$$x_0=(R_1 \bmod p)+R_2\cdot p \bmod p_2$$

$$x_1=(-R_1 \bmod p)+R_2\cdot p \bmod p_2$$

In some embodiments, $x_0$ may refer to an equation that is used to provide multiplicative masking for a bit of the input when the bit is at a value of '0' and $x_1$ may refer to an equation that is used to provide multiplicative masking for a bit of the input when the bit is at a value of '1.'

Furthermore, $R_1$ may represent a first random number, $R_2$ may represent a second random number, p may represent a prime number, and $p_2$ may represent a multiple of the prime number p. In some embodiments, the random number $R_1$ and/or $-R_1$ may be less than the value of the prime number p (e.g., the value $R_1$ is in a range from 1 to p−1). Furthermore, in some embodiments, the absolute value of $R_1$ and $-R_1$ are the same. Additionally, the multiplication of $R_2$ with p may result in the same value as $p_2$ or may result in a multiple of $p_2$ such that the modulus operation between the multiplication of $R_2$ and p with $p_2$ results in a value of 0 as previously described with relation to FIG. 4.

As shown in FIG. 5, the method 500 may begin by the processing logic receiving a bit of an input for a cryptographic operation (block 510). For example, the bit of the input may be one bit of multiple bits that correspond to an input (e.g., plaintext) that is to be encoded by a cryptographic algorithm (e.g., DES) to ciphertext. The processing logic may further determine if the received bit is at a value of '0' (block 520). The value tested in 520 may be set to '1' or may be randomly chosen as '0' or '1'. For example, the processing logic may identify whether the bit of the input is at a value of '0' or a value of '1.' If the bit is at a value of '0,' then the processing logic may compute an operation of a positive random number modulo a prime number (block 530). Furthermore, the processing logic may subsequently add a random multiple of the prime number modulo a fixed multiple of the prime number to the value of the first computation (block 540). Additionally, the processing logic may assign the value of the computation to the bit at the value of '0' (block 550). For example, the value of the bit may be transformed or replaced from the value of –0' to a result of the computations. However, if the processing logic determines that the bit is not at a value of '0' and is instead at a value of '1,' then the processing logic then the processing logic may compute an operation of a negative random number modulo the prime number (in comparison to the positive random number if the bit were at a value of '0') (block 560). Similarly, the processing logic may subsequently add a random multiple of the prime number modulo a fixed multiple of the prime number of the computation (block 570). Additionally the processing logic may assign the value of the computations to the bit at the value of '1' (block 580). For example, the value of the bit may be transformed or replaced from the value of '1' to a result of the computations (e.g., a negative value).

Figure 6:
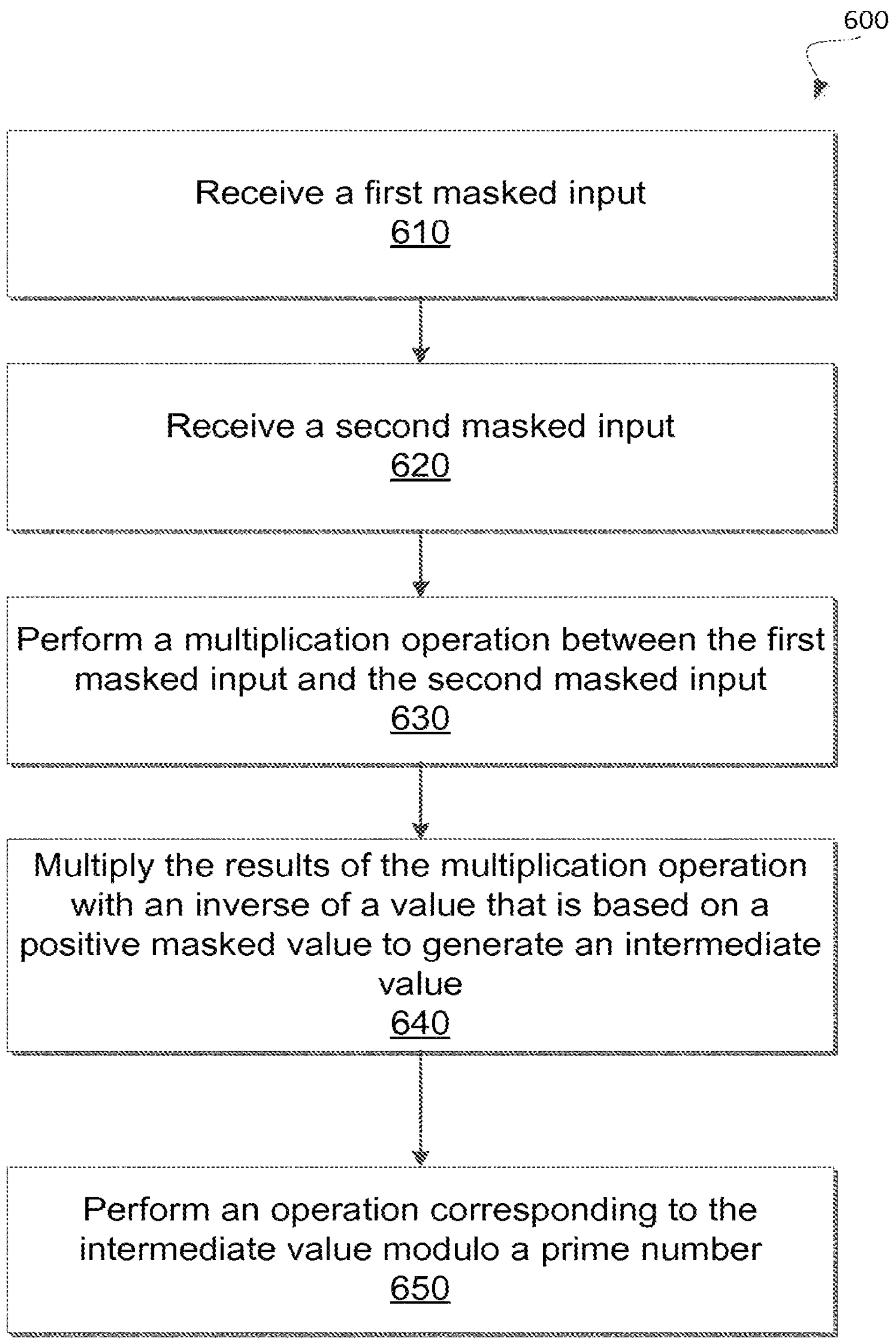
FIG. 6 is a flow diagram of an example method to perform a logical XOR operation in a cryptographic operation using inputs with a multiplicative mask in accordance with some embodiments.

As described above, a negative value (e.g., based on the computation using the negative random number) may be assigned to a bit value of '1' and a positive value (e.g., based on the computation using the positive random number) may be assigned to a bit value of '0.' In alternative embodiments, the negative value may be assigned to a bit value of '0' and a positive value may be assigned to a bit value of '1.' Furthermore, the processing logic may randomly select between a first transformation of the values '0' and '1' and a second transformation of the values '0' and '1.' For example, after receiving an input, the processing logic may randomly select between the first transformation that assigns a negative value to a bit value of '1' and a positive value to a bit value of '0' and the second transformation that may assign a negative value to a bit value of '0' and a positive value to a bit value of '1.' In some embodiments, the processing logic may select between the first transformation and the second transformation on a per input basis (e.g., each bit of an input may correspond to the use of the same first or second transformation that has been selected for the input). The selection between the first transformation and the second transformation may be random (e.g., the bit with a value of '0' may be randomly selected to be one of the negative value or the positive value and the bit with a value of may be the other one of the negative value or the positive value that was not selected to transform the bit with the value of '0.'), FIG. 6 is a flow diagram of an example method 600 to perform a logical XOR operation in a cryptographic operation using inputs with a multiplicative mask. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the multiplicative mask component 111 of FIG. 1 or the multiplicative mask component 300 of FIG. 3.

The method 600 may be used to perform a logical exclusive-or (XOR) operation that is used during a cryptographic operation that uses inputs with multiplicative masks. For example, the method 600 may be used to perform the logical XOR operation as described with regard to block 230 of FIG. 2 As previously described, examples of such cryptographic operations may be AES, DES, or other such operations to encrypt, decrypt, generate a signature, or verify a signature. In some embodiments, the method 600 may be used to perform a bitwise operation that corresponds to an XOR operation between a first input bit and a second input bit.

The method 600 may begin with the processing logic receiving a first input that has been masked (block 610). For example, a first input bit that has been multiplicatively masked may be received. The processing logic may further receive a second input that has been masked (block 620). The second input may be a second input bit that has been multiplicatively masked. The first input bit and the second input bit may be multiplicatively masked and transformed to a positive and negative number as described in conjunction with FIG. 5. For example, a bit at a value of '0' may be transformed to a negative value (e.g., a negative masked value) via the masking and a bit at a value of may be transformed to a positive value (e.g., a positive masked value) where the negative masked value and the positive masked value have the same absolute number. The processing logic may further perform a multiplication operation between the first masked input with the second masked input (block 630). For example, a multiplication operation may be performed between the first input bit and the second input bit after each corresponding input bit has been transformed or masked (e.g., from a '0' to a negative masked value or a '1' to a positive masked value). The processing logic may further multiply the results of the multiplication operation with an inverse of a value that is based on the positive masked value in order to generate an intermediate value (block 640). For example, as previously described, an input at a bit value of '1' may be masked to a positive masked value. As such, the results of the multiplication operation may be multiplied by the inverse of the positive masked value that corresponds to the value to which an input bit at a value of '1' is transformed to generate an intermediate value. The processing logic may further perform an operation corresponding to the intermediate value modulo a prime number (block 650). In some embodiments, the prime number may correspond to the prime number used to mask the input bits as described in conjunction with FIG. 5.

In some embodiments, the method 600 may perform a logical XOR operation based on the following equation when an input bit at a value of ‘0’ is transformed to a negative masked value and an input bit at a value of ‘1’ is transformed to a positive masked value:

$$\text{Result of XOR}=xym^{-1} \bmod p$$

In some embodiments, x may correspond to the first masked input bit, y may correspond to the second masked input bit, m may correspond to the positive masked value, and p may correspond to the prime number. The above equation may also be used when performing a logical XOR operation where an input bit at a value of ‘0’ is transformed to the positive masked value and the input bit at a value of ‘1’ is transformed to the negative masked value.

Figure 7:
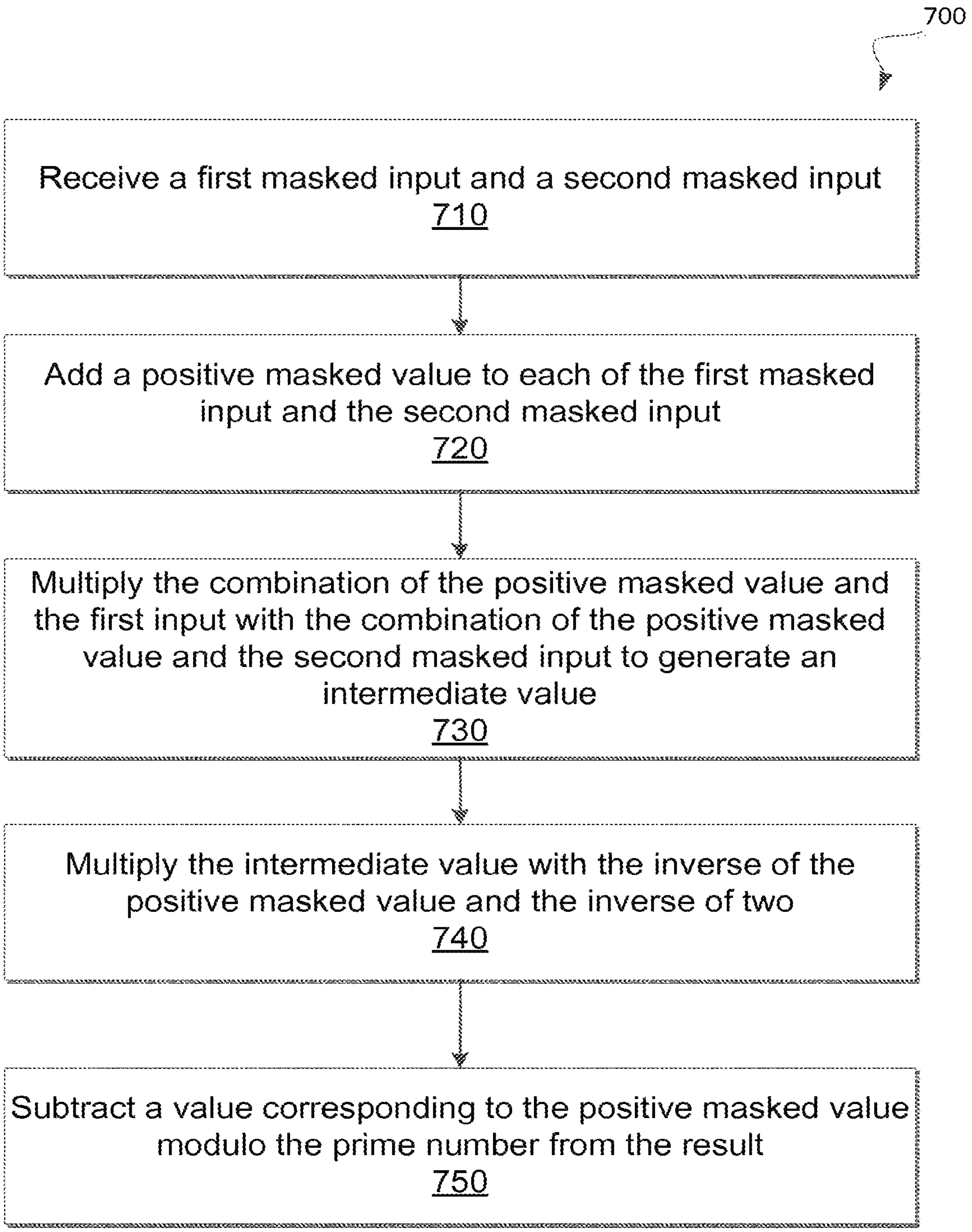
FIG. 7 is a flow diagram of an example method to perform a logical AND operation in a cryptographic operation using inputs with a multiplicative mask in accordance with some embodiments.

FIG. 7 is a flow diagram of an example method 700 to perform a logical AND operation in a cryptographic operation using inputs with a multiplicative mask. In general, the method 700 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 may be performed by the multiplicative mask component 111 of FIG. 1 or the multiplicative mask component 300 of FIG. 3.

The method 700 may be used to perform a logical AND operation that is used during a cryptographic operation that uses inputs with multiplicative masks. For example, the method 700 may be used to perform the logical AND operation as described with regard to block 230 of FIG. 2 As previously described, examples of such cryptographic operations may be AES, DES, or other such operations to encrypt, decrypt, generate a signature, or verify a signature. In some embodiments, the method 700 may be used to perform a bitwise operation that corresponds to an AND operation between a first input bit and a second input bit.

The method 700 may begin with the processing logic receiving a first masked input, or input bit, and a second masked input or input bit (block 710). The processing logic may further add the positive masked value, as described with regard to FIG. 6, to each of the first input and the second input (block 720). Furthermore, the processing logic may multiply the combination of the positive masked value and the first input with the combination of the positive masked value and the second input to generate an intermediate value (block 730). Furthermore, the processing logic may multiply the intermediate value with the inverse of the positive masked value and by the inverse of two (block 740). The processing logic may subsequently subtract a value corresponding to the positive masked value modulo the prime number from the result (block 750). For example, the value corresponding to the positive masked value module the prime number that is used in the masking of the first and second inputs may be subtracted from the results of the multiplication of the intermediate value with the inverse of the positive masked value and by the inverse of two.

In some embodiments, the method 700 may perform a logical AND operation based on the following equation when an input bit at a value of ‘0’ is transformed to the negative masked value and an input bit at a value of ‘1’ is transformed to the positive masked value:

$$\text{Result of AND}=2^{-1}m^{-1}(x+m)(y+m)-m \bmod p$$

In some embodiments, x may correspond to the first masked input bit, y may correspond to the second masked input bit, m may correspond to the positive masked value, and p may correspond to the prime number. In alternative embodiments when performing a logical AND operation where the input bit at a value of ‘0’ is transformed to the positive masked value and the input bit at the value of ‘1’ is transformed to the negative masked value, the following equation may be used to perform the logical AND operation:

$$\text{Result of AND}=2^{-1}m^{-1}(x-m)(y-m)+m \bmod p$$

As such, when the logical AND operation is performed when input bits at a value of ‘0’ are transformed to the positive masked value and input bits at a value of ‘1’ are transformed to the negative masked value, the first input bit and the second input bit may be subtracted by the value of the positive masked value as opposed to being added with the value of the positive masked value as described in conjunction with block 720 of FIG. 7.

) The performance of the logical AND operation and the logical XOR operation may further be based on reduction modulo 255 equation that is represented by the following operations when an input bit at a value of ‘0’ is transformed to a positive masked value corresponding to 1 mod 5 and an input bit at a value of ‘1’ is transformed to a negative masked value corresponding to −1 mod 5:

$$z \leftarrow x+5r^*$$

$$z \leftarrow (z\hat{\ }255)+(z/2^8)$$

In some embodiments, z may correspond to the output of the reduction modulo 255, x may correspond to a first input bit and r* may correspond to a 16 bit randomly generated value. As such, the reduction modulo 255 equation may include a first step that adds the prime number associated with the masked value multiplied with the randomly generated value to the input bit to generate a first result. Furthermore, the first result is subjected to an XOR operation with a value corresponding to 255 and the result is added with the first result divided by two raised to the power of eight. The reduction modulo 255 may be used to perform an XOR operation as follows:

$$z \leftarrow \text{ReductionModulo255}(yr,r^*)$$

$$z \leftarrow \text{ReductionModulo255}(xz,r^*)$$

$$Z \leftarrow \text{ReductionModulo255}(xr',r^*)$$

$$z \leftarrow \text{ReductionModulo255}(z,r^*)$$

In some embodiments, the ReductionModulo255 may correspond to a calling or performance of the reduction modulo 255 equation as earlier described with various first inputs and the second input being a random 16-bit number. Furthermore, x may correspond to the first input bit, y may correspond to the second input bit, z may correspond to an output, r may correspond to a random number between 1 through 254, r* may correspond to a value of $(mr)^{-1}$ (mod 5), and r* may correspond to a 16 bit random number. As such, the XOR operation may be performed by iteratively performing the reduction modulo 255 four times.

Furthermore, the reduction modulo 255 may be used to perform a NOT operation as follows:

$$z \leftarrow 4((x\ddot{\ }63)+r)+((x/2^6)+r)$$

$$z \leftarrow \text{ReductionModulo255}(z,r^*)$$

Additionally, an AND operation may be performed as follows:

$$z \leftarrow \text{ReductionModulo255}(r((x \div r'')+4(m \div r''),r^*)$$

$$z \leftarrow \text{ReductionModulo255}(z,r^*)$$

$$z \leftarrow \mathrm{ReductionModulo255}(z((y+r''')+4(m+r^*)$$

$$z \leftarrow \mathrm{ReductionModulo255}(r'z, r^*)$$

$$z \leftarrow \mathrm{ReductionModulo255}(2(z+r'')+(m+3r''), r^*)$$

In some embodiments, the initial value of z may correspond to a value of '0,' r may be a random value between 1 through 254, r' corresponds to a value of $(mr)^{-1}$ (mod 5), r* is a 16-bit random number between 1 and 65,535 (i.e., $2^{16}-1$), and where each of r'' and r''' are a different 8 bit random number between 1 and 254. As such, the AND operation may be performed by iteratively computing the reduction modulo 255 equation five times.

Figure 8:
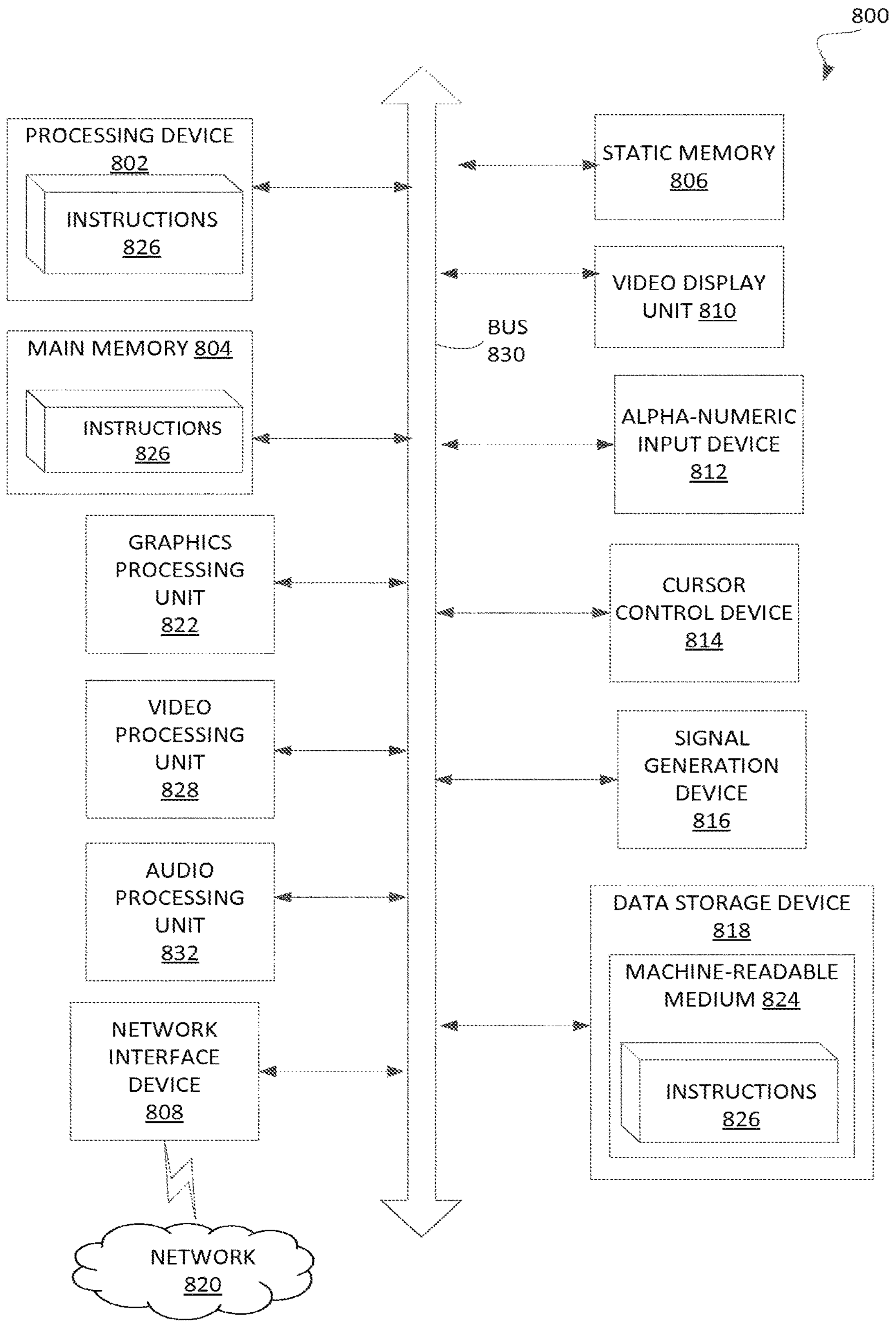
FIG. 8 illustrates a block diagram of an embodiment of a computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to a multiplicative mask component (e.g., multiplicative mask component 111 of FIG. 1 or multiplicative mask component 300 of FIG. 3). While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized, apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method to perform a cryptographic operation, the method comprising:

identifying, using a processing device and based on one or more inputs into the cryptographic operation, an input into a Boolean operation, wherein the input into the Boolean operation comprises a first masked input number and a second masked input number;

modifying, using a masking value, the first masked input number to obtain a first modified masked input number;

modifying, using the masking value, the second masked input number to obtain a second modified masked input number;

computing, using the processing device, a first intermediate value comprising a multiplication product of the first modified masked input number with the second modified masked input number;

computing, using the processing device, an output of the Boolean operation using the first intermediate value; and obtaining an output of the cryptographic operation using the output of the Boolean operation, wherein the cryptographic operation comprises one or more of:

a digital signature operation, a symmetric key cryptographic operation, or a public-private key cryptographic operation.

2. The method of claim 1, wherein the Boolean operation comprises an AND operation.

3. The method of claim 1, wherein the output of the Boolean operation comprises one of:

the masking value, or a negative of the masking value.

4. The method of claim 1, wherein the first masked input number represents a first input number and the second masked input number represents a second input number, and wherein each of the first masked input number and the second masked input number comprises:

the masking value taken with a first sign, provided that a corresponding input number has value 0, or the masking value taken with a second sign, provided that the corresponding input number has value 1.

5. The method of claim 1, wherein the masking value is randomly generated modulo a modulus number.

6. The method of claim 5, wherein the modulus number is a prime number.

7. The method of claim 1, wherein computing the output of the Boolean operation comprises:

computing a second intermediate value comprising a multiplication product of the first intermediate value with (i) an inverse of the masking value and (ii) an inverse of two modulo a modulus number.

8. The method of claim 7, wherein computing the output of the Boolean operation further comprises modifying the second intermediate value using one of:

adding the masking value to the second intermediate value, or subtracting the masking value from the second intermediate value.

9. A processing device to perform a cryptographic operation, comprising:

one or more registers to store, based on one or more inputs into the cryptographic operation:

a first masked input number representing a first input number into a Boolean operation, and a second masked input number representing a second input number into a Boolean operation, and one or more processing units to:

modify, using a masking value, the first masked input number to obtain a first modified masked input number;

modify, using the masking value, the second masked input number to obtain a second modified masked input number;

compute a first intermediate value comprising a multiplication product of the first modified masked input number with the second modified masked input number;

compute an output of the Boolean operation using the first intermediate value; and obtain an output of the cryptographic operation using the output of the Boolean operation, wherein the cryptographic operation comprises one or more of:

a digital signature operation, a symmetric key cryptographic operation, or a public-private key cryptographic operation.

10. The processing device of claim 9, wherein the Boolean operation comprises an AND operation.

11. The processing device of claim 9, wherein the output of the Boolean operation comprises one of:

the masking value, or a negative of the masking value.

12. The processing device of claim 9, wherein each of the first masked input number and the second masked input number comprises:

the masking value taken with a first sign, provided that a corresponding input number has value 0, or the masking value taken with a second sign, provided that the corresponding input number has value 1.

13. The processing device of claim 9, wherein the masking value is randomly generated modulo a modulus number, and wherein the modulus number is a prime number.

14. The processing device of claim 9, wherein to compute the output of the Boolean operation, the one or more processing units are to:

compute a second intermediate value comprising a multiplication product of the first intermediate value with (i) an inverse of the masking value and (ii) an inverse of two modulo a modulus number.

15. The processing device of claim 14, wherein to compute the output of the Boolean operation, the one or more processing units are further to:

add the masking value to the second intermediate value, or subtract the masking value from the second intermediate value.

16. A system comprising:

a processing device, and a memory operatively coupled to the processing device and storing instructions that cause the processing device to perform a cryptographic operation, including:

identifying, using a processing device and based on one or more inputs into the cryptographic operation, an input into a Boolean operation, wherein the input into the Boolean operation comprises a first masked input number and a second masked input number;

modifying, using a masking value, the first masked input number to obtain a first modified masked input number;

modifying, using the masking value, the second masked input number to obtain a second modified masked input number;

computing a first intermediate value comprising a multiplication product of the first modified masked input number with the second modified masked input number;

computing, using the first intermediate value, an output of the Boolean operation; and computing an output of the cryptographic operation using the output of the Boolean operation.

17. The system of claim 16, wherein the Boolean operation comprises an AND operation, and wherein the output of the Boolean operation comprises one of:

the masking value, or a negative of the masking value.

18. The system of claim 16, wherein computing the output of the Boolean operation comprises:

computing a second intermediate value comprising a multiplication product of the first intermediate value with (i) the masking value and (ii) an inverse of two modulo a modulus number; and modifying the second intermediate value using one of:

adding the masking value to the second intermediate value, or subtracting the masking value from the second intermediate value.

* * * * *